US008654782B2

(12) United States Patent
Meil et al.

(10) Patent No.: US 8,654,782 B2
(45) Date of Patent: Feb. 18, 2014

(54) MESH TREE FORMATION IN WIRELESS NETWORKS

(75) Inventors: Christopher Graham Meil, Akron, OH (US); Neal Dante Castagnoli, Morgan Hill, CA (US); Jyoti Raju, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 763 days.

(21) Appl. No.: 11/935,033

(22) Filed: Nov. 5, 2007

(65) Prior Publication Data

US 2009/0116411 A1    May 7, 2009

(51) Int. Cl.
*H04L 12/413* (2006.01)
(52) U.S. Cl.
USPC ............................ 370/445; 370/444; 370/450
(58) Field of Classification Search
USPC .......................... 370/348, 445, 444, 450, 406
See application file for complete search history.

(56) References Cited

U.S. PATENT DOCUMENTS

| 6,292,508 | B1 | 9/2001 | Hong et al. | |
|---|---|---|---|---|
| 6,925,064 | B2 | 8/2005 | Hester et al. | |
| 2004/0217948 | A1* | 11/2004 | Kawasaki et al. | 345/204 |
| 2005/0063458 | A1* | 3/2005 | Miyake et al. | 375/235 |
| 2007/0211680 | A1* | 9/2007 | Laroia et al. | 370/338 |
| 2008/0019432 | A1* | 1/2008 | Bremer et al. | 375/222 |
| 2008/0056200 | A1* | 3/2008 | Johnson | 370/333 |
| 2009/0067448 | A1* | 3/2009 | Stanwood et al. | 370/447 |

FOREIGN PATENT DOCUMENTS

WO    WO 2006102558 A2 *  9/2006

OTHER PUBLICATIONS

PCT Notification of Transmittal of The International Search Report and The Written Opinion of the International Searching Authority, or the Declaration (PCT Rule 44.1), dated Feb. 21, 2007 International Application No. PCT/USO6/10677).
Grace, K., "Mobile Mesh Link Discovery Protocol", Internet Draft, IETF MANET Working Group, the MITRE Corporation, Sep. 22, 2000. http://www.mitre.org/work/tech_transfer/mobilemesh/draft-grace-manet-mmldp-00.txt.
Grace, K., "Mobile Mesh Link Discovery Protocol", Internet Draft, IETF MANET Working Group, the MITRE Corporation, Sep. 22, 2000. http://www.mitre.org/work/tech_transfer/mobilemesh/draft-grace-manet-mmrp-00.txt.
Arumugam, Mahesh and Kulkarni, Sandeep S., "Self-Stabilizing Deterministic TDMA for Sensor Networks" Michigan State University, Computer Science and Engineering. Fall 2004. Web: http://www.cse.msu.edu/~farumugam, sandeep.
Herman, Ted and Tixeuil, Sebastien, "A Distributed TDMA Slot Assignment Algorithm for Wireless Sensor Networks", Apr. 2005. http://dcg.etchz.ch/lectures/ws0405/seminar/papers/distributedTDMA.pdf.
Perumal, Kanna, Petro, Ranjeet Kumar and Mohan, Balamurugan, "Neighbor Based TDMA Slot Assignment Algorithm for WSN", 2005. http://dcg.etchz.ch/lectures/ws0405/seminar/papers/distributedTDMA.pdf.

* cited by examiner

*Primary Examiner* — Omer S Mian
(74) *Attorney, Agent, or Firm* — Baker Botts L.L.P.

(57) ABSTRACT

A mesh tree formation system. In particular implementations, a method includes responsive to a selection of a channel potentially bearing a higher priority use, entering a silent state and initiating a channel scan of the selected channel for a period of time. The method also includes, responsive to receipt of an enabling signal, entering a limited transmission state that enables transmission of wireless frames on the selected channel. The method also includes, responsive to termination of the period of time of the channel scan wherein no higher priority use is detected, entering a full transmission state comprising transmission of enabling signals corresponding to the selected channel.

12 Claims, 4 Drawing Sheets

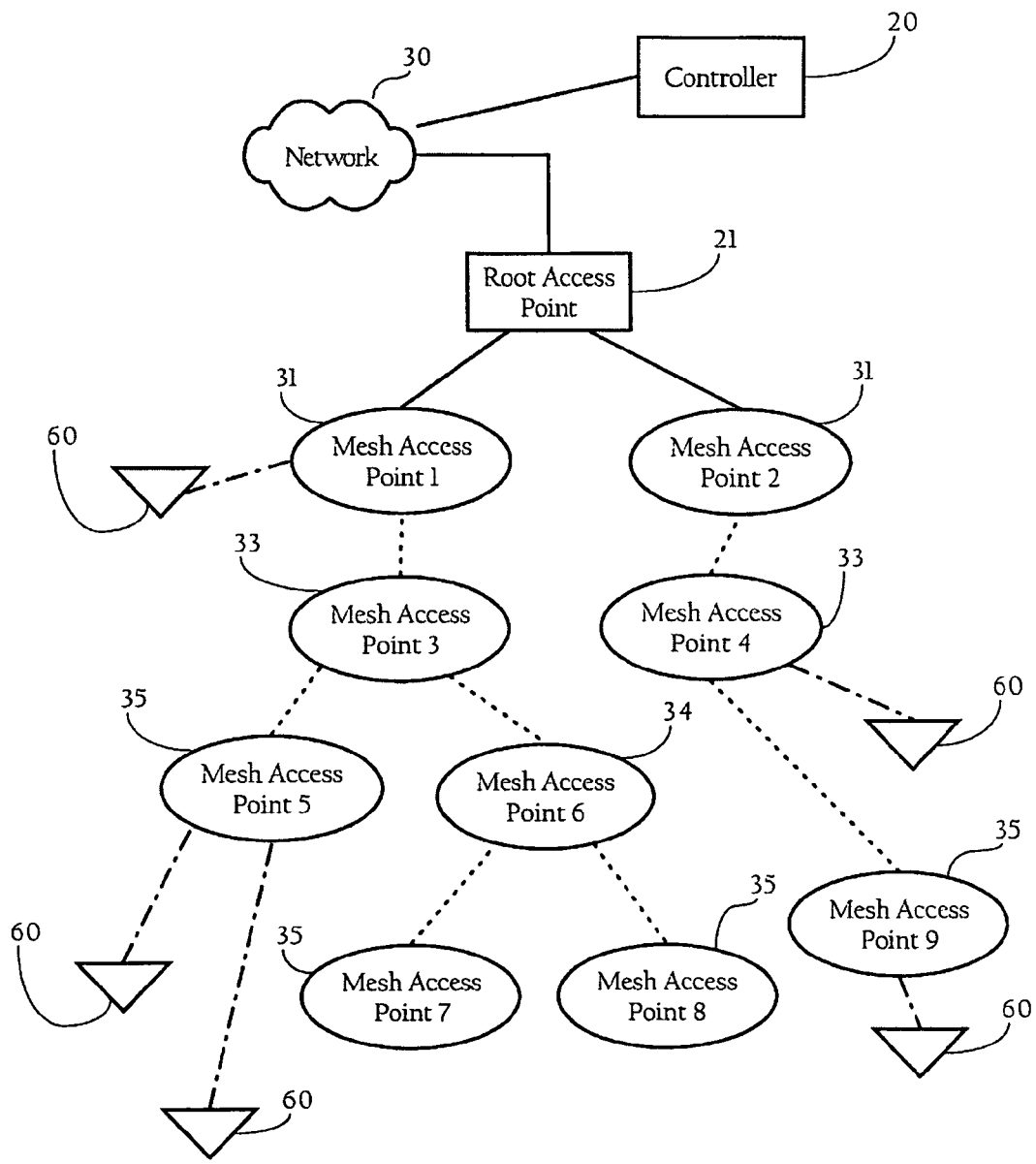
Fig._1

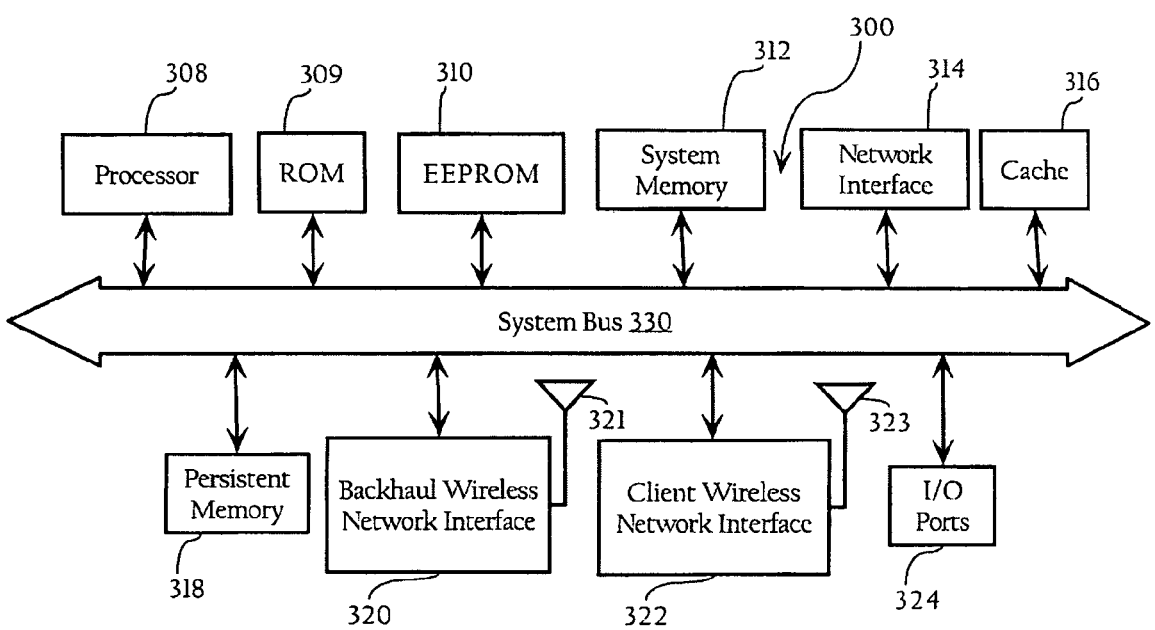
Fig._2

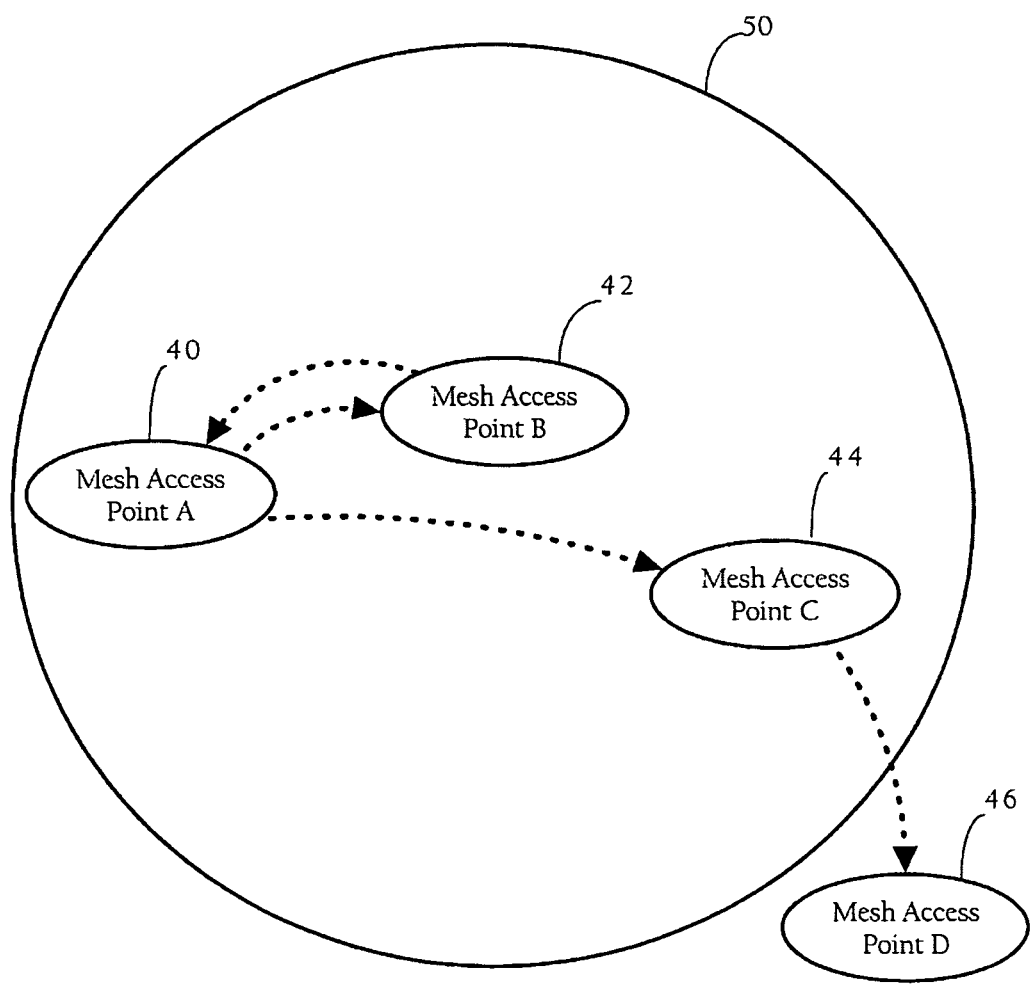
Fig._3

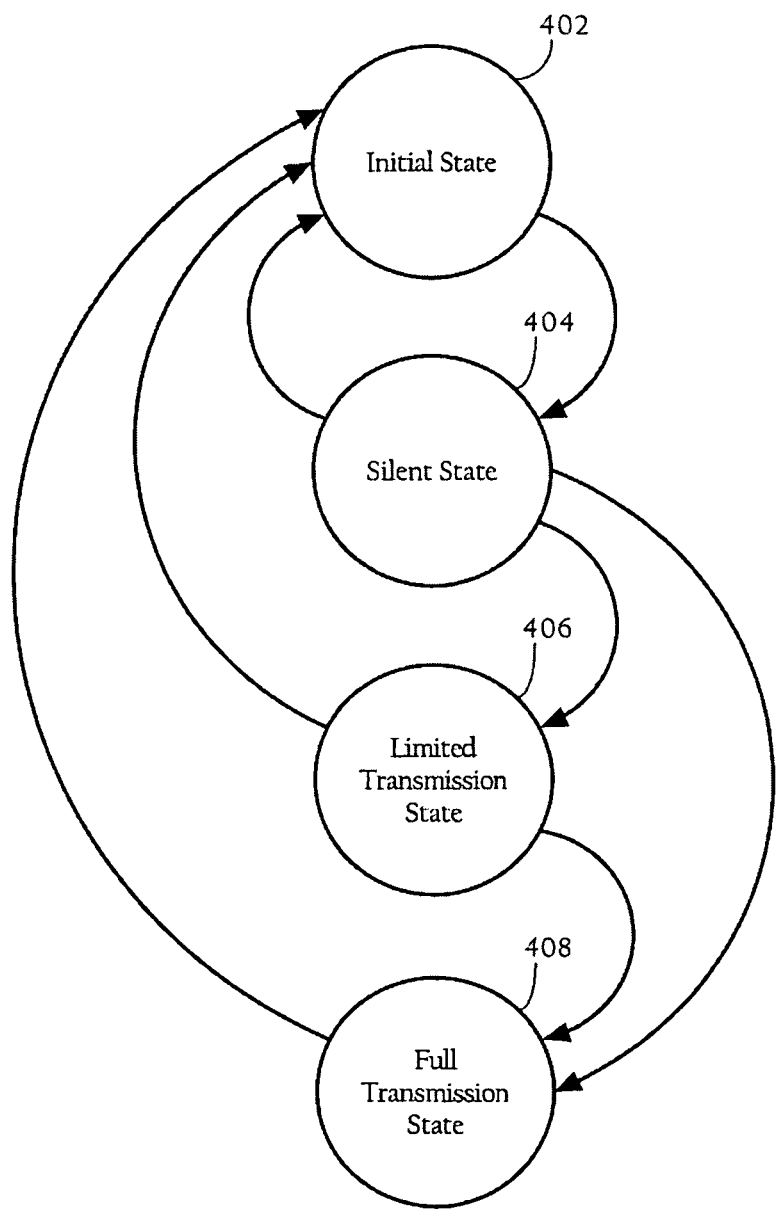
Fig._4

MESH TREE FORMATION IN WIRELESS NETWORKS

TECHNICAL FIELD

The present disclosure relates generally to wireless networks and mesh tree formation.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

Spectrum regulation has required that transmitters operating in the so-called radar channels or Dynamic Frequency Selection (DFS) channels, perform a "channel availability check" (CAC) prior to commencing transmissions on that channel. A channel availability check typically involves monitoring a candidate channel for 60 seconds to determine if radar transmissions are present. As spectrum regulation has given radar transmissions priority on the radar channel band, once radar transmissions are detected, wireless access points and their associated wireless clients must cease transmitting signals on that channel so as to not interfere with radar operations.

DFS is a mechanism that allows unlicensed devices to share spectrum with existing radar systems. The regulatory requirements for DFS have been adopted in the United States, Europe, and Japan, and these requirements are being considered by many other regulatory domains, which are considering the 5 GHz bands for unlicensed use. DFS specifies the types of radar waveforms to be detected and timing requirements for unlicensed operation in the DFS channel. DFS also specifies two different classes of devices: master device and slave device. A master device is a device that has radar detection capabilities and can control other devices in the network (e.g., an access point). A slave device is a device that does not initiate communication on a channel without authorization from a master device (e.g., a wireless client). Once a master device completes a CAC without detecting radar, the master device may transmit a DFS enabling signal, which allows slave devices to communicate with the master device.

DESCRIPTION OF THE DRAWINGS

FIG. 1 illustrates a wireless mesh network according to one implementation of the present invention.

FIG. 2 illustrates for didactic purposes a hardware system, which may be used to implement a wireless mesh access point in a wireless mesh network.

FIG. 3 illustrates an example network environment where mesh access points may join to form one or more mesh trees.

FIG. 4 illustrates an example state machine associated with mesh tree formation.

DESCRIPTION OF EXAMPLE EMBODIMENTS

A. Overview

Particular implementations facilitate the formation of mesh trees in wireless networks. According to particular implementations, a given mesh access point may function as both a slave device and as a master device before forming parent-child relationships with other mesh access points. As described in more detail below, the mesh access point may function as a slave device in that it may initiate communication on a given DFS channel after it receives a DFS enabling signal from a master device. The mesh access point may also initiate communication after completing its own CAC without detecting radar on the DFS channel. The mesh access point may also function as a master device in that it has radar detection capabilities and may control other mesh access points in the network. For example, after the mesh access point completes a CAC without detecting radar, the mesh access point may broadcast a DFS enabling signal to enable other mesh access points to transmit messages on the given DFS channel. The other mesh access points may be multiple hops away from the mesh access point. In one implementation, while the other mesh access point are enabled to transmit messages on the DFS channel, the mesh access points would not themselves broadcast any DFS enable signals until after first completing their own CAC without detecting radar on the DFS channel. In this manner, a mesh access point acts as both a master and a slave device to facilitate mesh tree formation.

Accordingly, mesh access points may form mesh trees faster while still allowing mesh access points to comply with DFS regulations. For example, a given mesh access point can itself begin to transmit messages as part of a mesh discovery or join protocol prior to completion of its own CAC, if it receives an enabling signal from another mesh access point. The mesh access point itself, however, does not transmit enabling signals until it completes a CAC without detecting radar or other priority signals. Implementations may apply to any mesh tree formation mechanism operating in a frequency band where at least for a portion of the band, a given mesh node is required to cede to higher-priority use if the mesh node detects the higher-priority use. For example, in a DFS implementation, a higher-priority use may be detected radar.

B. Example Wireless Mesh Network System Architecture

B.1. Network Topology

FIG. 1 illustrates a wireless mesh network according to one implementation of the present invention. In one implementation, the wireless mesh network includes a wireless mesh controller 20, a root access point 21, and a plurality of child wireless mesh access points. In one implementation, the mesh access points are logically arranged in a hierarchy for purposes of routing traffic to the root access point (RAP), and on to a network. In one implementation, this hierarchy can be dynamically configured and shifted based on discovery of wireless management messages between wireless mesh access points, or statically configured.

In one implementation, a hierarchical architectural overlay is imposed on the mesh network of routing nodes to create a downstream direction towards leaf routing nodes 35, and an upstream direction toward the root access point 21. For example, in the hierarchical mesh network illustrated in FIG. 1, first hop mesh access point 31 is the parent of intermediate mesh access point 33. In addition, intermediate mesh access points 33 and 34 are the parent to leaf mesh access point 35. In one implementation, this hierarchical relationship is used in routing packets between wireless clients 60, or between wireless clients 60 and network 30. Of course, a variety of wireless mesh network configurations are possible, including non-hierarchical configurations, and hierarchical configurations with fewer or greater number of hierarchical tree structures.

The mesh access points in the mesh network, in one implementation, generally include one radio, operating in a first frequency band, and associated wireless communication functionality to communicate with other mesh access points to thereby implement the wireless backbone, as discussed more fully below. All or a subset of the mesh access points, in one implementation, also include an additional radio, operating in a second, non-interfering frequency band, and other wireless communication functionality to establish and maintain wireless connections with mobile stations, such as wireless client 60. For example, in 802.11 wireless networks, the backbone radios on the wireless routing nodes may transmit wireless packets between each other using the 802.11a protocol on the 5 GHz band, while the second radio on each mesh access point may interact with wireless clients on the 2.4 GHz band (802.11h/g). Of course, this relation can also be reversed with backhaul traffic using the 802.11b/g frequency band, and client traffic using the 802.11a band. In addition, the mesh access points may include only a single radio or additional radios.

In one implementation, some wireless mesh networks can include a controller and a plurality of mesh access points that are configured into one or more routing and control hierarchies based on automatic neighbor and route discovery protocols. In some environments, individual mesh access points automatically discover their neighbors and configure hierarchical routing configurations by selecting parent nodes based on a variety of factors. Mesh access points, in some systems, connect to a wireless controller through one or more parents nodes in the routing hierarchy. Both neighbor discovery and parent joining protocols implemented by the mesh access points involve transmission and receipt of messages. As discussed herein, the transmission of messages can be delayed, when operating on a DFS channel, until a DFS-enabling signal is received or a CAC is performed. In one implementation, a mesh access point transmits discovery messages with other mesh access points to exchange routing information and may then join a mesh by selecting a parent. As described in more detail below, a given mesh access point suspends transmission of any messages during a silent state, which results from the mesh access point switching to the DFS channel. If the mesh access point receives a DFS enabling signal, the mesh access point enters a limited transmission state and may exchange discovery messages with (and potentially select as a parent) the mesh access point that transmitted the DFS enabling signal. After selecting a parent and after completing a CAC, the mesh access point enters a full transmission state and may periodically transmits neighbor maintenance messages indicating parent and other routing information. In particular implementations, the neighbor maintenance messages may include DFS enabling information. If another mesh access point receives the DFS enabling information, that mesh access point may potentially select as a parent the mesh access point that transmitted the DFS enabling information.

B.2. Wireless Mesh Access Point

FIG. 2 illustrates for didactic purposes a hardware system, which may be used to implement a wireless mesh access point in a wireless mesh network. In one implementation, the wireless mesh access point 300 comprises a processor 308, a read-only memory (ROM) 309, and an electronically erasable read-only memory (EEPROM) 310. The wireless mesh access point 300 may also include one or more of the following: a memory 312, a network interface 314 (e.g., an 802.3 interface) for communication with a LAN, a cache 316 for storing WLAN information, and a persistent memory 318. The wireless mesh access point 300 may also include a backhaul wireless network interface 320 having an antenna 321. Backhaul wireless network interface 320 is configured to transmit and receive messages to/from one or more other wireless mesh access points in a mesh network. The wireless mesh access point 300 may also include a client wireless network interface 322 (e.g., an IEEE 802.11 WLAN interface) having an antenna 323. Client wireless network interface 322 is configured for wireless communication with one or more wireless clients 60. The backhaul wireless network interface 320 and client wireless network interface 322 may be radio interfaces. The wireless mesh access point 300 may also include input/output (I/O) ports 324 and a system bus 330 interconnecting these components.

In some implementations, wireless mesh access point use one or more of the following standards: WiFi/802.11, WiMax/802.16, 2 G, 3 G, or 4 G Wireless, Bluetooth/802.15, Zigbee, or any other suitable wireless communication standards. In one implementation, wireless mesh access point may have a separate access radio, and associated interface components, for communicating with a wireless client or other portable computer. The wireless mesh access points may also include software modules, including Dynamic Host Configuration Protocol (DHCP) clients, transparent bridging. Lightweight. Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, one or more of these software components are loaded into system memory 312 and then accessed and executed by processor 310. In one implementation, the wireless mesh access point 300 includes software or firmware modules for recognizing the reception of network management information and for storing such information in memory (e.g., EEPROM 310).

C. Basic Wireless Network Environment for Mesh Tree Formation

FIG. 3 illustrates an example network environment where mesh access points may join to form one or more mesh trees. FIG. 3 shows mesh access points 40, 42, 44, and 48, which have not joined to form a mesh tree and a radar range 50. In order to form a mesh tree, each mesh access point 40-46 initially scans and exchanges routing entries with neighboring mesh access points in order to select a parent with the optimal path.

In one implementation, a given mesh access point may function as both a DFS master device and a DFS slave device before forming parent-child relationships. For example, as described in more detail below, mesh access point C 44 may function as a master device in that it has radar detection capabilities and can control other devices in the network (e.g., a mesh access point D 46). Mesh access point C 44 may also function as a slave device in that, prior to completion of its own local CAC, it does not initiate communication on a channel without receiving an enabling signal from a master device (e.g., mesh access point A 40). Once a given mesh access point performs a CAC on a given DFS channel without detecting radar, that mesh access point may DFS enable multiple mesh access points, even those that are multiple hops away, without each of those DFS enabled mesh access points having to first perform a CAC on the DFS channel. Accordingly, mesh access points may form mesh trees faster while still allowing every mesh access point to comply with the DFS silence requirements.

Before a given mesh access point selects a parent (and during discovery and join protocols), the mesh access point need not enter a silent state and perform a CAC before transmitting messages if the mesh access point detects a DFS enabling signal on a given DFS channel. For example, if mesh access point A 40 completes a CAC on the DFS channel and then broadcasts a DFS enabling signal on the DFS channel, mesh access point B 42 may exchange routing information with mesh access point A 40 and may join access point A 40 before mesh access point B 42 begins a CAC. Mesh access point B 42 may transmit any type of message (e.g., discovery messages, light weight access point (LWAP) messages, etc.) other than a DFS enabling signal. For example, mesh access point B 42 may exchange mesh routing information with the mesh access point A 40, where mesh access point B 42 is in the process of selecting a parent access point and where mesh access point A 40 may be a candidate for becoming a parent access point. This process may expedite the routing exchange from 60 seconds per channel to a nominal 500 ms per channel. The overall time for convergence may be reduced from N*60000 ms to N*500 ms where N is the number of unique frequencies on which candidate parents are available to the child mesh access point.

In one implementation, mesh access point B 42 will not broadcast any DFS enabling signals until after completing a CAC without any detection of radar. If mesh access point C 44 also detects the DFS enabling signal from mesh access point A 40, mesh access point C 44 may also begin transmitting messages (e.g., to mesh access point A 40 and/or other mesh access points) on the DFS channel and join other mesh access points in the mesh tree before mesh access point C 44 begins a CAC. This is advantageous because a given mesh access point (e.g., mesh access point C 44) that is multiple hops away and quite a distance away (e.g., 60 meters), may quickly enter and communicate with other mesh access points in the mesh network without current parent-child relationships. Accordingly, mesh access points may form mesh trees faster because they each need not wait to perform a CAC before transmitting messages to each other.

Mesh access point C 44 will then broadcast DFS enabling signals after completes its CAC. As such, other mesh access points (e.g., mesh access point D 46) that may not be within range of mesh access point A 40, but may be within the range of mesh access point C 44 would detect the DFS enabling signal from mesh access point C 44. If mesh point C 44 detects radar during the CAC, the mesh access point will not send out a DFS enabling signal. As such, mesh access point D 46 would not be enabled to communicate.

Implementations described herein may enable faster mesh tree formation of multiple mesh trees in DFS environments. For example, in one implementation, mesh access point A 40 and mesh access point B 42 may be in one mesh tree, and mesh access point C 44 and mesh access point D 46 may be in a different mesh tree, where mesh access point A 40 enables mesh access point C 44. As such, mesh access point C 44 need not join mesh access point A 40 but may still exchange messages with and even join mesh access point D 46. In particular implementations, mesh access point may also form ad hoc networks. For example, mesh access point C 44 and mesh access point D 46 may form an ad hoc network.

In one implementation, a DFS enabling signal may be any generic message, where the DFS enabling indication is implicit in the receipt of the message. In one implementation, the DFS enabling signal may be any generic message having a DFS enabling information element (IE), DFS enabling field or DFS enabling bit that is configured for DFS enablement. In one implementation, the transmission of the DFS signal may occur on the current DFS channel being enabled or on a different channel relative to the current DFS channel being enabled.

In one implementation, the DFS enabling signal may be a relatively short transmission that may be encoded at lower data rates than normal network traffic. Because of this, a given packet may be received in a wide ring around a master device generating a DFS signal. In other words, a lower data rate extends the propagation distance of DFS signals. Mesh access points may use higher data rates for data transmission. As such, mesh access points may select parent access points that are not as distant as the enabling master device. In particular implementations, lower data rates may be accomplished using any suitable but common wireless 802.11 or other wireless network chip sets that are configurable for lower data rates.

D. State Machine for Mesh Tree Formation

FIG. 4 illustrates an example state machine associated with mesh tree formation. As FIG. 4 shows, in one implementation, the state machine includes an initial state 402, a silent state 404, a limited transmission state 406, and a full transmission state 408. As described in more detail below, the state machine enables a given mesh access point to function both as a master device that enables other mesh access points to transmit frames on a given DFS channel and as a slave device that is enabled by a master device to transmit frames on the DFS channel. In one implementation, the state machine maintains one or more state variables that other processes or functions may access to determine whether to perform various functions, such as transmitting discovery messages on DFS channels, transmitting enabling signals, and the like.

D.1. Initial State

In one implementation, a mesh access point enters the initial state 402, if the mesh access point initializes and is set to a DFS channel, or if the mesh access point performs a channel change to a DFS channel. In one implementation, the entering the initial state causes the state machine to set both a master silence bit and a slave silent bit in the mesh access point. As FIG. 4 illustrates, the state machine transitions from the initial state 402 to the silent state 404. In one implementation, the state machine also sets a CAC timer to a predefined time period (e.g., 60 seconds), and monitors the DFS channel for a higher priority use, such as radar.

D.2. Silent State

In one implementation, in the silent state 404, the mesh access point will not transmit any data because the slave silence bit is set. In one implementation, if the mesh access point receives a DFS enabling signal, the state machine clears the slave silence bit, and the state machine transitions from the silent state 404 to the limited transmission state 406. In one implementation, during the silent state 404, the mesh access point performs a CAC. After completing the CAC (e.g., after 60 seconds) without detecting any radar on the DFS channel, the state machine clears the slave silence bit and the master silence bit, and the state machine transitions from the silent state 404 to the full transmission state 408.

D.3. Limited Transmission State

In one implementation, in the limited transmission state 406, because the slave silence bit is cleared, the mesh node may transmit messages on the DFS channel, such as exchanging routing information with its candidate parent mesh node, on the channel that received the enabling signal. In one implementation, the master silence bit remains set while in the limited transmission state. As such, the mesh node does not transmit any DFS-enabling signals. In one implementation, not transmitting DFS-enabling signals prevents child mesh nodes from clearing their slave silence bits.

In one implementation, after the CAC timer completes its 60-second CAC period, if the mesh node does not detect radar on the DFS channel during the CAC, the state machine clears the master silence bit, and the state machine transitions from the limited transmission state 406 to the full transmission state 408.

D.4. Full Transmission State

In one implementation, in the full transmission state 408, both the slave silence bit and the master silence bit are cleared. This removes the transmission restrictions imposed on the mesh access point. As such, the mesh access point may transmit both data and DFS enabling signals. As a result, other mesh access points that detect the DFS enabling signal themselves clear their respective slave silence bits and beginning transmitting messages that result in formation of the mesh network.

In one implementation, during silent state 404, the limited transmission state 406 or the full transmission state 408, the state machine sets the slave silence bit, and the state machine returns to the initial state 402 if the mesh access point detects radar or if the mesh access point performs a channel change. In one implementation, whenever the state machine sets the slave silence bit, the state machine also sets the master silence bit and initiates a new CAC.

Implementations described herein provide numerous advantages. For example, implementations may apply to any mesh tree formation mechanism operating in a frequency band where for at least a portion of the band, a given mesh node is required to cede to higher-priority use if the mesh node detects the higher-priority use. Implementations also reduce any delays associated with forming connectivity in a mesh network on DFS channels; maintain the network topology despite an inability of mesh access points to transmit packets; and allow portions of a mesh tree to operate normally as authorised by a single master device.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A method comprising:
   responsive to a selection of a dynamic frequency selection (DFS) channel, entering, at a mesh routing node, a silent state and initiating, by the mesh routing node, a DFS channel access scan of the selected channel for a radar signal for a period of time, wherein during the silent state the mesh routing node does not transmit any data;
   responsive to receipt of a DFS enabling signal during the period of time, entering, at the mesh routing node, a limited transmission state during which the mesh routing node exchanges routing information with candidate parent mesh routing nodes on the selected channel and does not transmit DFS enabling signals while executing the DFS channel access scan for the radar signal for the period of time, wherein the DFS enabling signal indicates that the device transmitting the DFS enabling signal has performed a DFS channel access scan of the selected channel and has not detected the radar signal; and
   responsive to termination of the period of time of the DFS channel scan initiated by the mesh routing node wherein the radar signal is not detected by the mesh routing node, entering, at the mesh routing node, a full transmission state comprising exchanging, by the mesh routing node, routing information with candidate parent mesh routing nodes and transmitting DFS enabling signals corresponding to the selected channel, wherein the DFS enabling signals are operative to cause one or more neighboring mesh routing nodes, upon receiving the DFS enabling signals, to enter the limited transmission state during respective DFS channel scans performed by the one or more neighboring mesh routing nodes;
   wherein the routing information comprises discovery and mesh formation messages.

2. The method of claim 1 further comprising performing both master device functionality to enable transmission of the routing information on the selected channel and slave device functionality to become enabled to transmit the routing information on the selected channel.

3. The method of claim 1 further comprising transmitting DFS enabling signals at lower data rate relative to regular transmissions.

4. The method of claim 1 wherein the DFS enabling signals enable transmission of the routing information in a plurality of mesh trees.

5. One or more non-transitory, tangible computer readable media storing logic for execution and when executed operable to:
   responsive to a selection of a dynamic frequency selection (DFS) channel, enter, at a mesh routing node, a silent state and initiating a DFS channel scan of the selected channel for a radar for a period of time, wherein during the silent state the mesh routing node does not transmit any data;
   responsive to receipt of a DFS enabling signal during the period of time, enter, at the mesh routing node, a limited transmission state during which the mesh routing node exchanges routing information with candidate parent mesh routing nodes on the selected channel and does not transmit DFS enabling signals while executing the DFS channel access scan for the radar signal for the period of time, wherein the DFS enabling signal indicates that the device transmitting the DFS enabling signal has performed a DFS channel access scan of the selected channel and has not detected the radar signal; and
   responsive to termination of the period of time of the DFS channel scan initiated by the mesh routing node wherein the radar signal is not detected by the mesh routing node, enter a full transmission state comprising exchanging, by the mesh routing node, routing information with candidate parent mesh routing nodes and transmitting DFS enabling signals corresponding to the selected channel, wherein the DFS enabling signals are operative to cause one or more neighboring mesh routing nodes, upon receiving the DFS enabling signals, to enter the limited transmission state during respective DFS channel scans performed by the one or more neighboring mesh routing nodes;
   wherein the routing information comprises discovery and mesh formation messages.

6. The one or more non-transitory, tangible computer readable media of claim 5 wherein the logic is further operable to perform both master device functionality to enable transmission of routing information on the selected channel and slave device functionality to become enabled to transmit routing information on the selected channel.

7. The one or more non-transitory, tangible computer readable media of claim 5 wherein the logic is further operable to transmit DFS enabling signals at lower data rate relative to regular transmissions.

8. The one or more non-transitory, tangible computer readable media of claim 5 wherein the DFS enabling signals enable transmission of routing information in a plurality of mesh trees.

9. An apparatus comprising:
one or more processors;
a memory;
one or more wireless network interfaces;
state transition logic encoded in one or more tangible media for execution and when executed operable to cause the one or more processors to:
transition from an initial state to a silent state if the apparatus performs at least one of detecting radar, initializing and being set to a dynamic frequency selection (DFS) channel, and switching to the DFS channel;
transition from the silent state to a limited transmission state if the apparatus receives a DFS enabling signal during a DFS channel availability check;
transition from the silent state to a full transmission state if the apparatus completes the DFS channel availability check without detecting a radar signal on the channel; and
transition from the limited transmission state to the full transmission state if the apparatus completes the DFS channel availability check without detecting the radar signal on the channel; and
mesh access point logic encoded in one or more tangible media for execution and when executed operative to cause the one or more processors to:
responsive to the silent state, suspend transmission of any data on the channel and perform a DFS channel availability check;
responsive to the limited transmission state, transmit messages comprising discovery and mesh formation information, and not transmit DFS enabling signals while executing the DFS channel access scan for the radar signal for the period of time wherein the DFS enabling signal indicates that the device transmitting the DFS enabling signal has performed a DFS channel access scan of the selected channel and has not detected the radar signal; and
responsive to the full transmission state, transmit messages comprising discovery and mesh formation information, and DFS enabling signals on the channel, wherein the DFS enabling signals are operative to cause one or more neighboring mesh routing nodes, upon receiving the DFS enabling signals, to enter the limited transmission state during respective DFS channel scans performed by the one or more neighboring mesh routing nodes.

10. The apparatus of claim 9 wherein a master bit and a slave bit in the apparatus are set during the initial state and during the silent state.

11. The apparatus of claim 9 wherein a slave bit in the apparatus is cleared during the limited transmission state.

12. The apparatus of claim 9 wherein a master bit and a slave bit in the apparatus are cleared during the full transmission state.

* * * * *